US010033451B2

(12) United States Patent
Cho et al.

(10) Patent No.: US 10,033,451 B2
(45) Date of Patent: Jul. 24, 2018

(54) METHOD OF ALLOCATING RESOURCES IN PATTERN/POLARIZATION BEAM DIVISION MULTIPLE ACCESS-BASED TRANSMITTING APPARATUS, METHOD OF TRANSMITTING CHANNEL INFORMATION BY RECEIVING APPARATUS AND RECEIVING APPARATUS BASED ON PATTERN/POLARIZATION BEAM DIVISION MULTIPLE ACCESS

(71) Applicant: Korea Advanced Institute of Science and Technology, Daejeon (KR)

(72) Inventors: Dong Ho Cho, Daejeon (KR); Byung Chang Chung, Daejeon (KR); Dae Hee Park, Daejeon (KR); Joon Sang Han, Daejeon (KR); Yun Sik Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/441,917

(22) Filed: Feb. 24, 2017

(65) Prior Publication Data
US 2017/0244467 A1    Aug. 24, 2017

(30) Foreign Application Priority Data
Feb. 24, 2016  (KR) .......................... 10-2016-0021926

(51) Int. Cl.
H04B 7/08 (2006.01)
H04B 7/0413 (2017.01)
(Continued)

(52) U.S. Cl.
CPC ......... *H04B 7/0822* (2013.01); *H04B 7/0413* (2013.01); *H04B 7/0626* (2013.01);
(Continued)

(58) Field of Classification Search
CPC . H04W 72/046; H04W 72/042; H04W 88/08; H04W 16/28; H04W 36/0055;
(Continued)

(56) References Cited

U.S. PATENT DOCUMENTS

2009/0322613 A1    12/2009  Bala et al.
2010/0165914 A1*    7/2010  Cho ..................... H04B 7/0695
370/328
(Continued)

*Primary Examiner* — Vineeta Panwalkar
(74) *Attorney, Agent, or Firm* — Paratus Law Group, PLLC

(57) ABSTRACT

A receiving apparatus based on pattern/polarization beam division multiple access (BDMA) including an antenna configured to receive a reference signal related to at least one of patterns and polarizations of a plurality of antennas included in a transmitting apparatus, and configured to transmit channel information, and a controller configured to select a particular antenna group among a plurality of antenna groups that are grouped from the plurality of antennas included in the transmitting apparatus using the reference signal, and configured to generate the channel information corresponding to the particular antenna group.

13 Claims, 9 Drawing Sheets

(51) Int. Cl.
　　　*H04B 7/06*　　　(2006.01)
　　　*H04B 7/10*　　　(2017.01)
　　　*H04L 5/00*　　　(2006.01)
(52) U.S. Cl.
　　　CPC ......... *H04B 7/0802* (2013.01); *H04B 7/0825* (2013.01); *H04B 7/0874* (2013.01); *H04B 7/10* (2013.01); *H04L 5/005* (2013.01)
(58) Field of Classification Search
　　　CPC ............... H04W 36/30; H04W 72/085; H04W 72/1289; H04B 7/0408; H04B 7/0617; H04B 7/0413; H04B 7/0626; H04B 7/0695; H04B 7/0452; H04B 7/0822; H04B 7/0874; H04B 7/0802; H04B 7/0825; H04B 7/10; H04L 5/005
　　　See application file for complete search history.

(56) References Cited

U.S. PATENT DOCUMENTS

2014/0146902 A1\* 5/2014 Liu ...................... H04B 7/0689
　　　　　　　　　　　　　　　　　　　　375/260
2015/0236773 A1　8/2015 Kim et al.

\* cited by examiner

[FIG. 1]
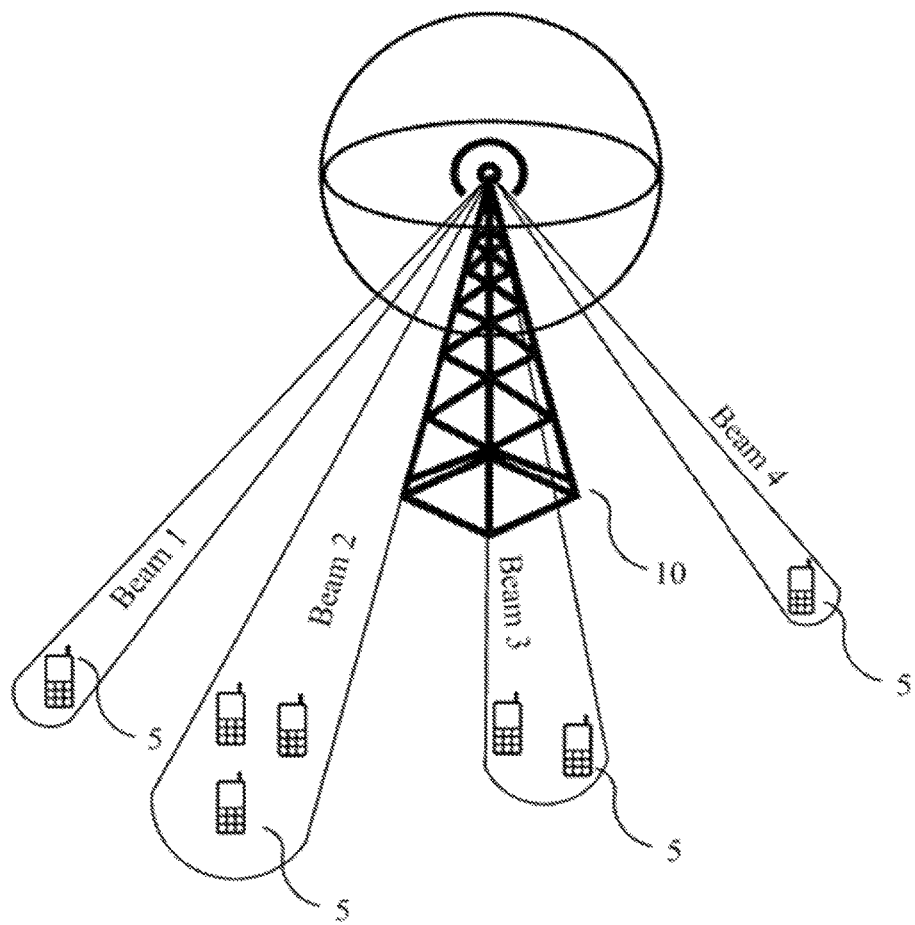

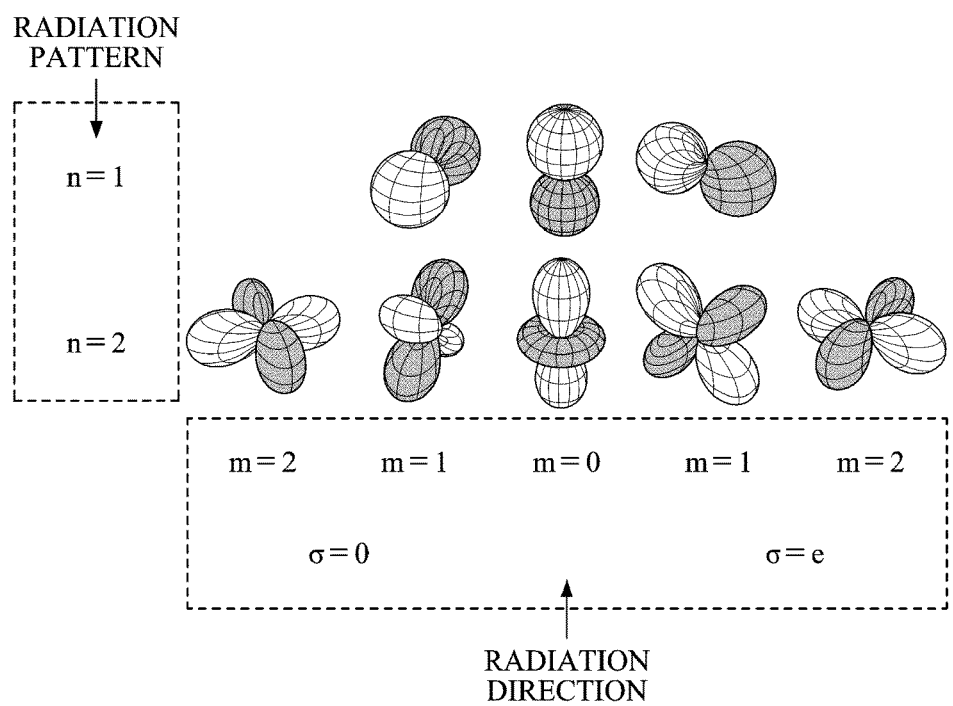

[FIG. 3]
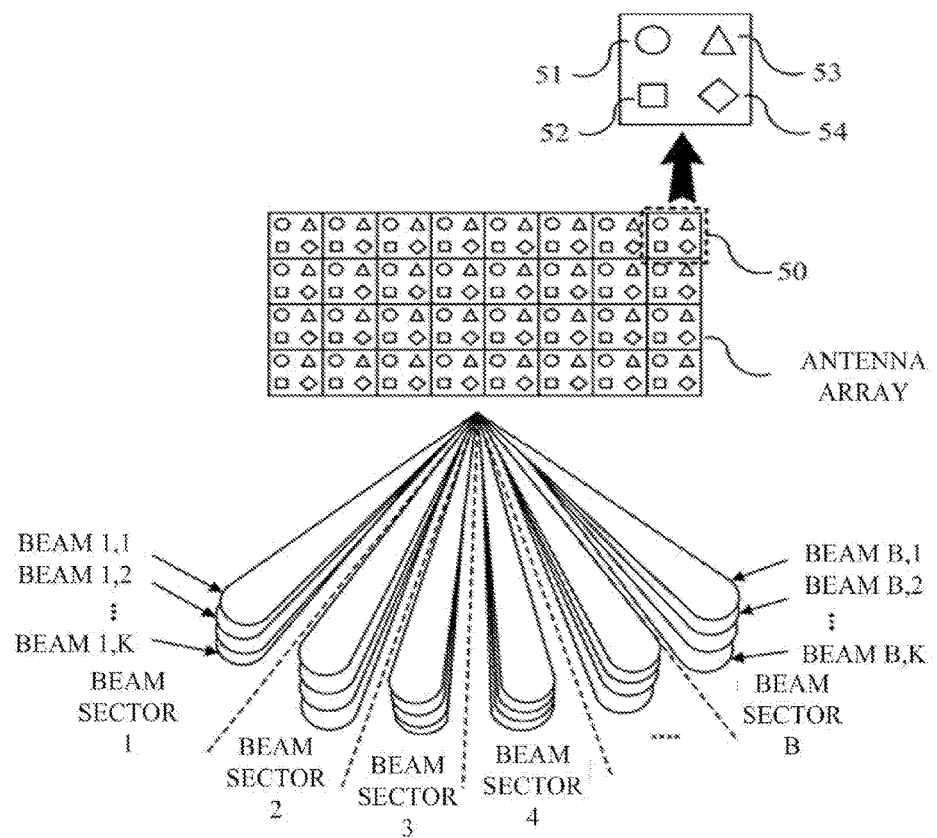

[FIG. 4]
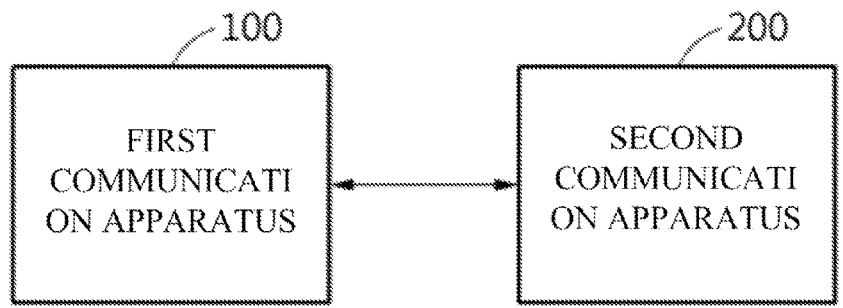
[FIG. 5]
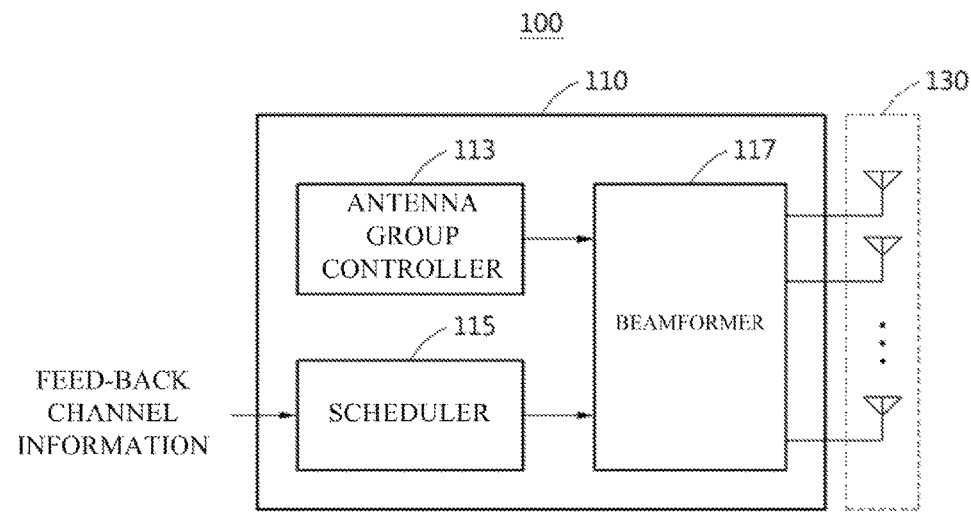

[FIG. 6]
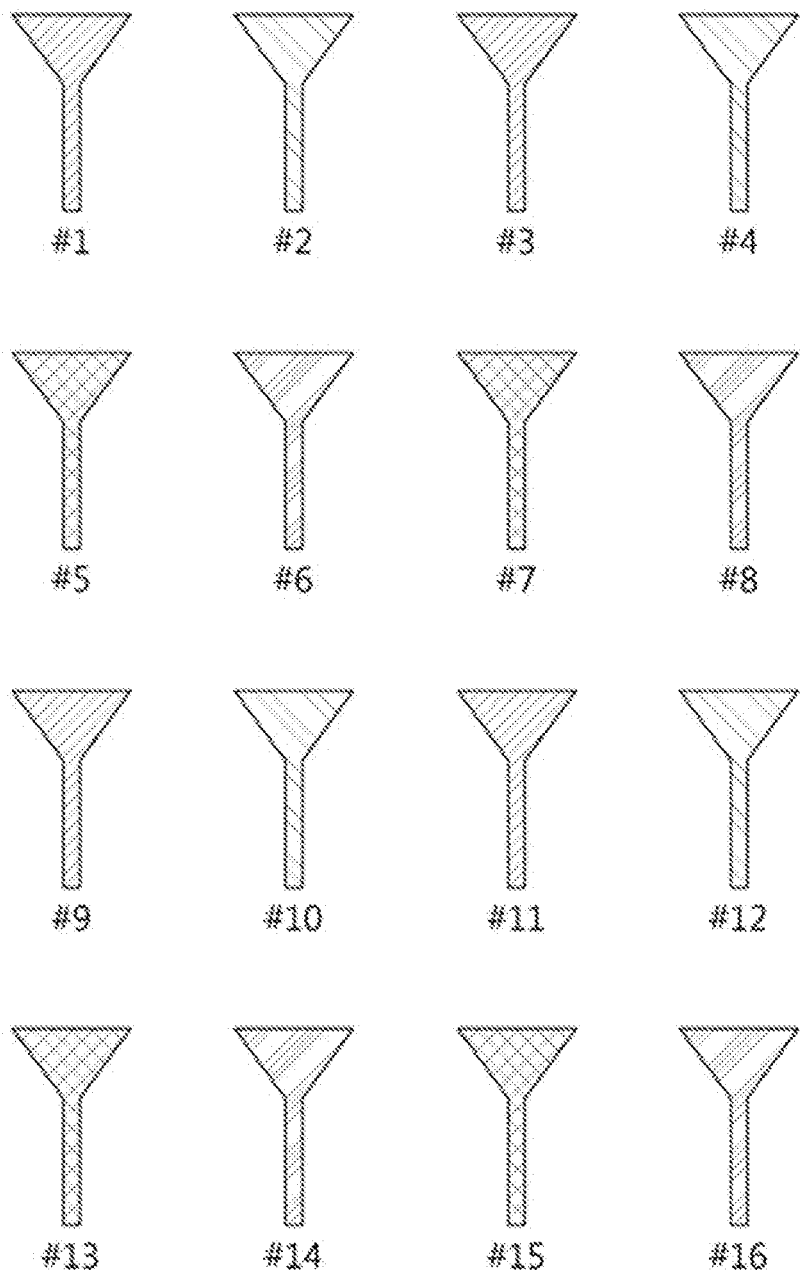

[FIG. 7]
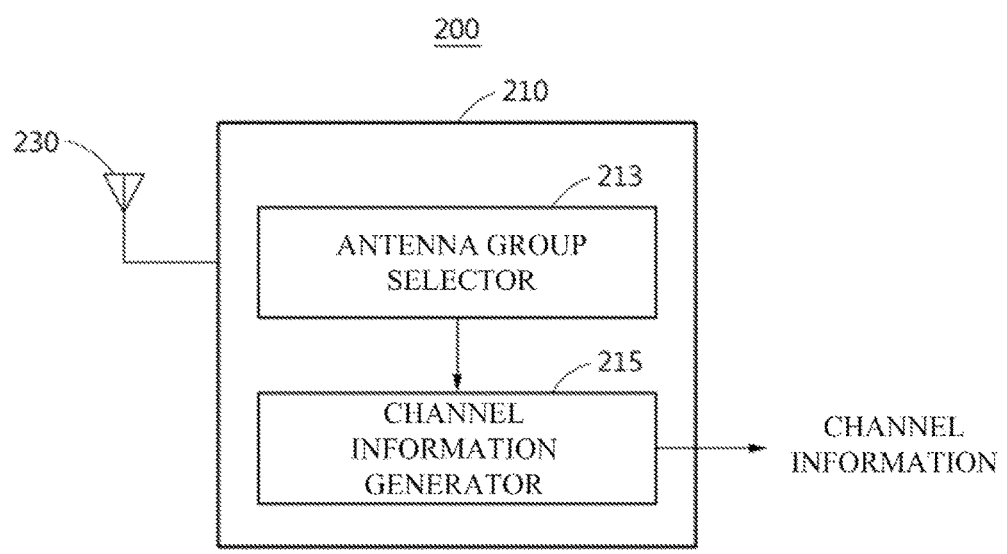

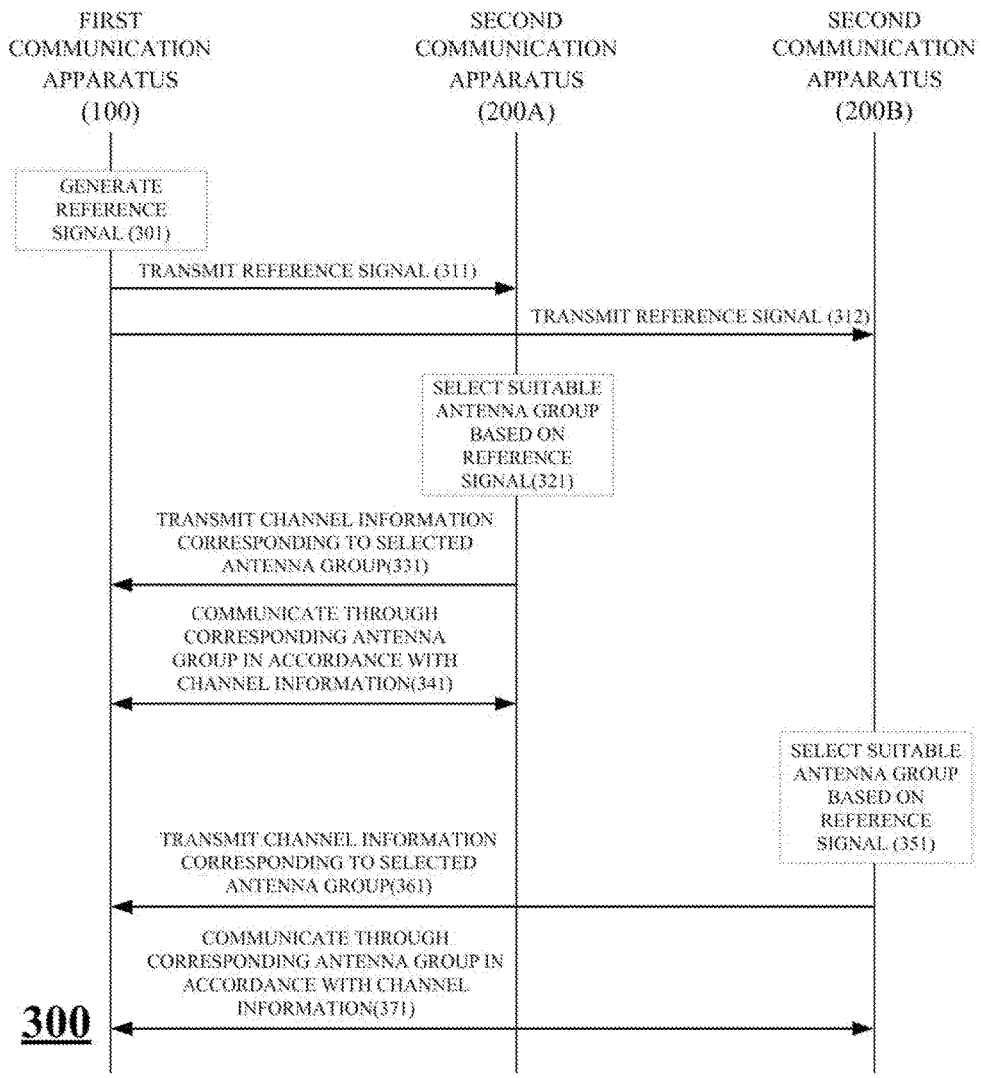

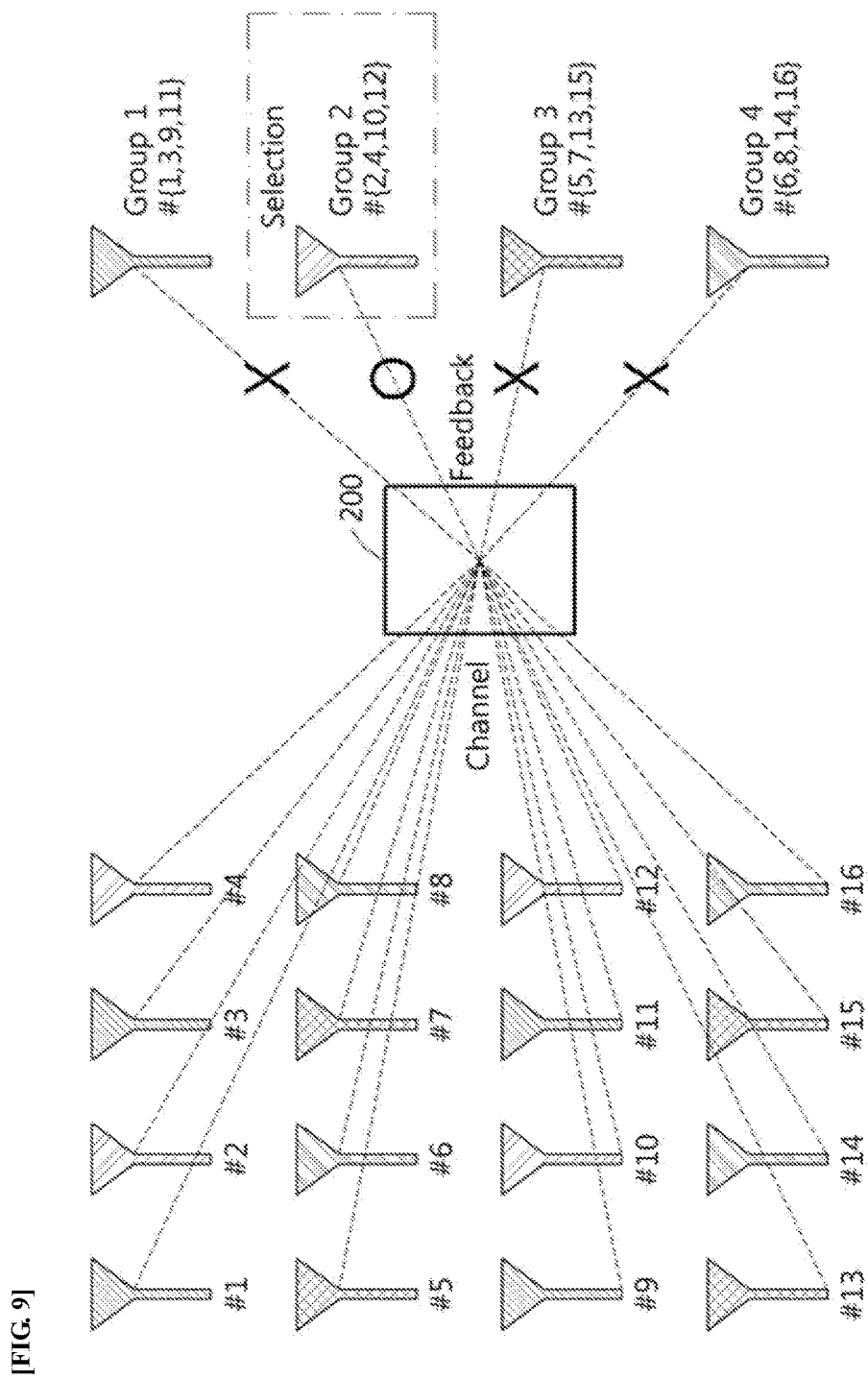
[FIG. 9]

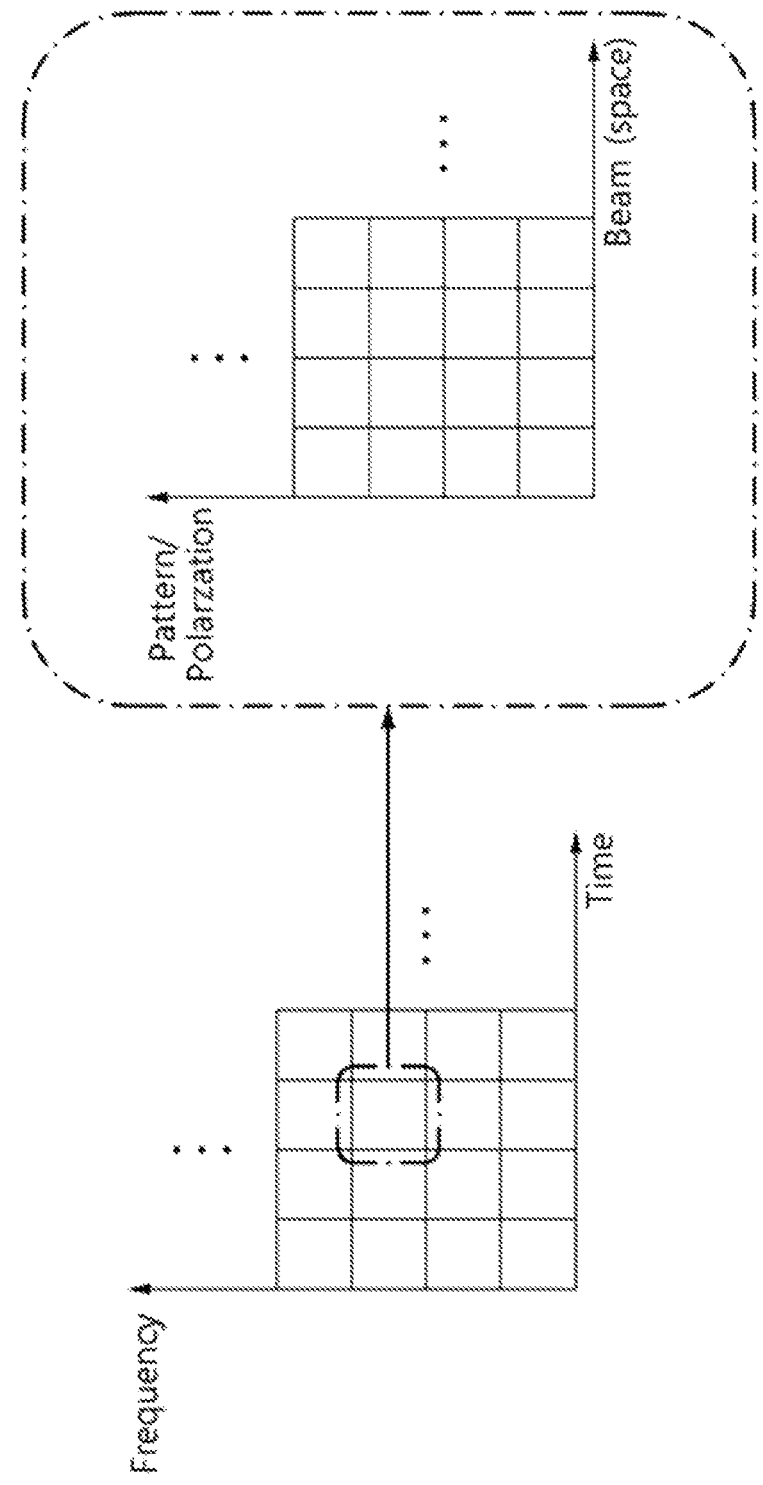
[FIG. 10]

METHOD OF ALLOCATING RESOURCES IN PATTERN/POLARIZATION BEAM DIVISION MULTIPLE ACCESS-BASED TRANSMITTING APPARATUS, METHOD OF TRANSMITTING CHANNEL INFORMATION BY RECEIVING APPARATUS AND RECEIVING APPARATUS BASED ON PATTERN/POLARIZATION BEAM DIVISION MULTIPLE ACCESS

CROSS-REFERENCE TO RELATED APPLICATION

This application claims the benefit under 35 USC 119(a) of Korean Patent Application No. 10-2016-0021926 filed on Feb. 24, 2016 in the Korean Intellectual Property Office, the entire disclosure of which is incorporated herein by reference for all purposes.

BACKGROUND

The following description relates to a technology for allocating resources in a communication system.

In a multiple-input and multiple-output (MIMO) wireless communication system, multiple antennas having the same characteristic are disposed at an interval equal to or larger than a half-wavelength of a carrier frequency, thereby obtaining diversity gain or multiplexing gain.

The massive MIMO technology considered to be a next generation communication technology, the number of antennas used has been remarkably increased as many as 32, 64, 128, etc., and the increase in the number of antennas leads to limitation on a space occupied by antennas.

Radiation pattern characteristics of antennas vary with the structures of the antennas, and thus pattern/polarization characteristics-using antennas may increase the antenna integration ratio per unit space when compared with the conventional antennas. Also, the unique quality of the pattern/polarization characteristics-using antennas may cause channel gain to be isolated.

However, as the number of antennas in the massive MIMO technology is rapidly increased, there is a growing concern about the resources used in reporting channels allocated to antennas and terminals, that is, channel feedback bits.

SUMMARY

In one general aspect, there is provided a method of transmitting channel information in a pattern/polarization beam division multiple access (BDMA) based receiving apparatus, the method including: selecting, by a receiving apparatus, a particular antenna group among a plurality of antenna groups that are grouped from a plurality of antennas included in a transmitting apparatus on the basis of a reference signal received from the transmitting apparatus; and transmitting, by the receiving apparatus, channel information corresponding to the particular antenna group to the transmitting apparatus.

In another general aspect, there is provided a method of allocating resources in a transmitting apparatus based on pattern/polarization beam division multiple access (BDMA), the method including: transmitting, by a transmitting apparatus, a reference signal with respect to a plurality of antennas that are grouped into a plurality of antenna groups; receiving, by the transmitting apparatus, channel information about a particular antenna group that is selected by a receiving apparatus from the plurality of antenna groups by using the reference signal; and allocating, by the transmitting apparatus, a resource to the particular antenna group by using the channel information.

In yet another general aspect, there is provided a receiving apparatus based on pattern/polarization beam division multiple access (BDMA), the receiving apparatus including an antenna and a controller. The antenna receives a reference signal related to at least one of patterns and polarizations of a plurality of antennas included in a transmitting apparatus and transmits channel information. The controller selects a particular antenna group among a plurality of antenna groups that are grouped from the plurality of antennas included in the transmitting apparatus using the reference signal and generates the channel information corresponding to the particular antenna group.

BRIEF DESCRIPTION OF THE DRAWINGS

FIG. 1 illustrates an example of a beam division multiple access (BDMA) system.

FIG. 2 illustrates an example of a radiation pattern using a pattern/polarization antenna.

FIG. 3 illustrates an example of a pattern/polarization BDMA system.

FIG. 4 illustrates an example of block diagram for a communication system.

FIG. 5 illustrates an example of block diagram for a first communication apparatus.

FIG. 6 illustrates an example of a plurality of antennas having pattern/polarization characteristics.

FIG. 7 illustrates an example of block diagram for a second communication apparatus.

FIG. 8 illustrates an example of flowchart for allocating resources in a communication system.

FIG. 9 illustrates an example of a process in which a receiving apparatus selects an antenna group of a transmitting apparatus.

FIG. 10 illustrates an example of resources allocated by a transmitting apparatus.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The technology to be described hereinafter relates to a technology for allocating resources in a beam division multiple access (BDMA) system. Also, the technology to be described hereinafter relates to a technology for allocating resources in a BDMA system using a pattern/polarization antenna (hereinafter, referred to as a pattern/polarization BDMA system).

FIG. 1 illustrates an example of a beam division multiple access (BDMA) system.

The BDAM system represents a wireless communication system based on a BDMA technology. The BDMA system allows an access point (AP) apparatus 10 to transmits beams to terminals 5 located at different angles (directions) so that data are simultaneously transmitted to the terminals 5 (downlink). It is assumed that the AP apparatus 10 is aware of the positions of the terminals 5 in advance. The AP apparatus 10 may use an antenna which changes the direction of a beam or perform beamforming in a predetermined range.

Even when the terminal 5 sends data to a base station, the terminal 5 also transmits a beam directed to the AP apparatus. A single terminal does not exclusively use a beam, but shares one beam with other terminals located at adjacent angular positions, to communicate with a base station. For example, referring to FIG. 1, a beam Beam2 serves as a channel in which three terminals communicate with the AP apparatus 10. In this case, terminals sharing one beam are preferable to use different frequency/time resources.

The AP apparatus 10 includes an apparatus such as a base station in mobile communication. For example, the AP apparatus 10 includes types of a base station forming a macrocell in mobile communication, an AP apparatus forming a small cell in mobile communication, an AP apparatus in WiFi, and an AP apparatus for a short range communication, such as ZigBee. In the following description, the AP apparatus 10 represents an apparatus that communicates with the terminal 5 by a particular communication method. The AP apparatus 10 may serve to connect a core network to the terminal 5. For convenience of description, it is assumed that the AP apparatus 10 is a base station (Node-B, eNode-B, etc.) in a mobile communication network.

The terminal 5 includes various apparatuses that perform wireless communication through the AP apparatus 10. For example, the terminal 5 includes a smartphone, a tablet PC, a notebook, a wearable device, etc. Generally, the terminal 5 may come to have a mobility, carried by a user. Also, the terminal 5 may come to have a mobility, attached to a moving apparatus (a vehicle). In the following description, for convenience of description, the terminal 5 is assumed as a portable apparatus carried by a user, such as a smartphone.

FIG. 2 illustrates an example of a radiation pattern using a pattern/polarization antenna.

The pattern/polarization BDMA system performs communication by use of a pattern/polarization antenna. Generally, an antenna forms a predetermined beam as described above. The antenna includes an antenna element. Further, the antenna element may exhibit a different characteristic depending on the shape and material thereof.

The antenna may have a radiation pattern in a predetermined shape according to the characteristic of the antenna element. FIG. 2 shows an example of a radiation pattern that may be provided by an antenna. In FIG. 2, two radiation patterns (n=1 and n=2) are illustrated mainly. The radiation pattern even with the same shape may form different patterns depending on the direction thereof. FIG. 2 illustrates three different radiation patterns with respect to a radiation pattern (n=1) and five different radiation patterns with respect to a radiation pattern (n=2). Also, when the antenna is provided using a polarization antenna, different patterns may be provided depending on the directions in which an electric field and a magnetic field propagate. In FIG. 2, σ represents a direction of rotation of the radiation pattern.

When the AP apparatus 10 transmits a signal using a unique radiation pattern (a first radiation pattern), the terminal 5 may receive the signal by distinguishing the first radiation pattern from other radiation patterns. In other words, a radiation pattern serves as a channel that transmits a signal, separately from a beam.

In the following description, a pattern antenna represents an antenna apparatus in which a plurality of antenna elements having a predetermined pattern are arranged at a predetermined interval. The pattern antenna may include a plurality of antenna elements having different patterns from each other. In this case, the antenna element may be an element having a unique radiation pattern. In the following description, a polarization antenna represents an antenna apparatus in which a plurality of antenna elements having a predetermined polarization pattern are arranged at a predetermined internal. As described above, the polarization antenna may represent an antenna that transmits a signal distinguished in the electric field domain and the magnetic field domain by simultaneously using an electric field antenna and a magnetic field antenna. In the following description, a pattern/polarization antenna represents an antenna apparatus that uses a plurality of antenna elements having predetermined patterns as well as a plurality of antenna elements having predetermined polarization patterns.

FIG. 3 illustrates an example of a pattern/polarization BDMA system.

The pattern/polarization BDMA system represents a wireless communication system based on a pattern/polarization BDMA technology. The upper portion of FIG. 3 illustrates an example of the pattern/polarization antenna. Referring to FIG. 3, the pattern/polarization antenna may be an antenna array. That is, the pattern/polarization antenna may include a plurality of unit pattern/polarization antennas. Hereinafter, an antenna array including a plurality of unit pattern/polarization antennas is referred to as a pattern/polarization antenna array. Referring to FIG. 3, a single unit pattern/polarization antenna 50 is indicated with a rectangular dotted line. A single unit pattern/polarization antenna 50 includes a plurality of antennas 51, 52, 53, and 54. The plurality of antennas 51, 52, 53, and 54 have different radiation patterns.

The pattern/polarization antenna array may constitute B beam sectors through beamforming. The pattern/polarization antenna array may spatially divide beams according to the beam sectors using beamformers having unique weight values for the respective beam sectors, and may transmit beams having the same angle of direction (AoD) using different pattern/polarization antennas. Accordingly, the pattern polarization antenna array may allow signals having different pattern/polarization characteristics in each beam sector to be simultaneously transmitted. Referring to FIG. 3, K different radiation patterns are simultaneously transmitted using K pattern/polarization antennas. That is, by using the pattern polarization antenna array, multiple-input multiple-output (MIMO) transmission may be achieved. When the terminal 5 uses a single antenna, multiple-input single-output (MISO) may be performed.

As described above, the BDMA system using a pattern/polarization antenna is referred to as a pattern/polarization BDMA system. In the pattern/polarization BDMA system, interference between multiple pattern/polarization signals included in the same beam sector is previously removed by a precoder, and the pattern/polarization signals from which interference is removed are transmitted. The pattern/polarization BDMA system may obtain not only a beamforming gain according to the conventional BDMA technology but also a pattern polarization gain using the pattern/polarization antenna.

FIG. 4 illustrates an example of block diagram for a communication system. The communication system in FIG. 4 may be also a pattern/polarization BDMA system.

A communication system 1000 may include a first communication apparatus 100 and a second communication apparatus 200.

The communication system 1000 may perform communication in a wireless communication environment. For example, the communication system 1000 may be implemented in $3^{rd}$ generation partnership project (3GPP), long-term evolution (LTE), LTE-advanced (LTE-A), 3GPP2, and world interoperability for microwave access (WiMAX).

The communication system 1000 may be a system that performs communication through a channel. That is, the first communication apparatus 100 and the second communication apparatus 200 may communicate with each other through a channel between the first communication apparatus 100 and the second communication apparatus 200.

The first communication apparatus 100 and the second communication apparatus 200 may be provided as at least one of a base station, a relay station, and a terminal. The base station may be referred to as a mobile station, a fixed station, a Node-B, an eNode-B, a base transceiver system (BTS), or an AP. The terminal may be referred to as a user equipment (UE), a mobile station (MS), a mobile terminal (MT), a user terminal (UT), a wireless terminal, an access terminal (AT), a subscriber unit, a subscriber station (SS), a wireless device, a wireless communication device, a wireless transmit/receive Unit (WTRU)), a mobile node, or a mobile.

The terminal may be implemented using a portable electronic apparatus. The portable electronic apparatus may be implemented using a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device (PND) or portable navigation device, a handheld game console, an e-book, or smart device. For example, the smart device may be implemented as a smart watch or a smart band.

The first communication apparatus 100 may be a transmitting apparatus, and the second communication apparatus 200 may be a receiving apparatus. For example, the first communication apparatus 100 may be a base station and the second communication apparatus 200 may be a terminal.

The first communication apparatus 100 may transmit a reference signal to the second communication apparatus 200.

In this case, the second communication apparatus 200 may select particular antennas among a plurality of antennas included in the first communication apparatus 100 on the basis of the reference signal transmitted from the first communication apparatus 100. The second communication apparatus 200 may select an antenna group including the particular antennas among the plurality of antennas. For example, the second communication apparatus 200 may select an antenna group that is suitable for communication with the second communication apparatus 200. In the following description, an antenna group may represent a group to which selected antennas among a plurality of antennas of the first communication apparatus 100 belong.

Then, the second communication apparatus 200 may send channel information corresponding to the antenna group to the first communication apparatus 100.

The first communication apparatus 100 may provide the second communication apparatus 200 with a service through the antennas included in the antenna group in response to the received channel information. That is, the first communication apparatus 100 may perform communication with the second communication apparatus 200 by allocating resources to the antennas included in the antenna group selected by the second communication apparatus 200.

Hereinafter, configurations and operations of the first communication apparatus 100 and the second communication apparatus 200 will be described in detail.

FIG. 5 illustrates an example of block diagram for a first communication apparatus 100.

The first communication apparatus 100 may include a controller 110 and an MIMO antenna 130.

The controller 110 may control the overall operation of the first communication apparatus 100. The controller 110 generates a reference signal for channel information to be fed back from the second communication apparatus 200. The controller 110 may generate a reference signal corresponding to a plurality of antennas included in the MIMO antenna 130. The controller 110 may perform control such that the generated reference signal is transmitted to the second communication apparatus 200 through the MIMO antenna 130.

In addition, the controller 110 may receive channel information fed back from the second communication apparatus 200, and perform control such that communication is performed through antennas belonging to an antenna group selected by the second communication apparatus 200 on the basis of the received channel information.

The controller 110 may be implemented using a printed circuit board (PCB) such as a motherboard, an integrated circuit (IC), or a system on chip (SoC).

The controller 110 may include an antenna group controller 113, a scheduler 115, and a beamformer 117. Also, the controller 110 may include a signal generator (not shown) configured to generate a reference signal.

The antenna group controller 113 may group a plurality of antennas included in the MIMO antenna 130. For example, the antenna group controller 113 may generate antenna groups by grouping a plurality of antennas according to at least one of an antenna pattern characteristic and an antenna polarization characteristic. Antennas included in one antenna group may be antennas having at least one of a pattern characteristic and a polarization characteristic which is identical between the antennas in the one antenna group.

The scheduler 115 may receive channel information fed back from the second communication apparatus 200, and schedule such that the first communication apparatus 100 communicates with the second communication apparatus 200 through an antenna group corresponding to the channel information.

The beamformer 117 may generate beams by performing beamforming. The beamformer 117 may transmit the generated beams to the second communication apparatus 200 through the MIMO antenna 130.

Also, the beamformer 117 may transmit the generated beams to the second communication apparatus 200 through the antenna group selected by the second communication apparatus 200 according to control of the scheduler 115.

The MIMO antenna 130 may include a plurality of antennas. In FIG. 5, the MIMO antenna 130 is illustrated as being provided outside the controller 110, but according to embodiments, the MIMO antenna 130 may be provided inside the controller 110.

As described above, the antenna may provide various communication channels according to the types of patterns and polarizations. For example, when the first communication apparatus 100 transmits a signal using a unique radiation pattern (a first radiation pattern), the second communication apparatus 200 may receive the signal by distinguishing the first radiation pattern from other radiation patterns. The radiation pattern serves as a channel that transmits a signal, separately from a beam. The radiation pattern may be changed according to a pattern characteristic of an antenna element. Also, the radiation pattern may be changed according to a polarization characteristic of an antenna element. In other words, a plurality of antennas may each have at least one of a pattern characteristic and a polarization characteristic. An antenna having a particular pattern characteristic and/or a particular polarization characteristic exhibits a particular radiation pattern.

The antenna group controller 113 may group antennas into a plurality of antenna groups according to at least one of a pattern characteristic and a polarization characteristic. Antennas included in one antenna group may be antennas having a pattern characteristic and/or a polarization characteristic that is identical between the antennas in the one antenna group.

Accordingly, the first communication apparatus 100 may have a pattern and/or polarization gain in addition to an MIMO gain.

The first communication apparatus 100 may provide the second communication apparatus 200 with a service while having the antenna group including antennas which are identical in at least one of the pattern characteristic and polarization characteristic as basis units for MIMO transmission.

As described above, the first communication apparatus 100 transmits a reference signal. The second communication apparatus 200 selects a particular antenna group from among a plurality of antennas on the basis of the reference signal. To this end, the first communication apparatus 100 may generate a reference signal corresponding to each of the plurality of antennas. The first communication apparatus 100 may generate a reference signal related to a beam of an antenna. Also, the first communication apparatus 100 may generate a reference signal related to a pattern characteristic and/or polarization characteristic of an antenna.

The antenna group controller 113 may group the plurality of antennas 130 included in the first communication apparatus 100 according to the pattern characteristic and/or polarization characteristic. In this case, the first communication apparatus 100 may transmit reference signals for the respective antenna groups.

FIG. 6 illustrates an example of a plurality of antennas having pattern/polarization characteristics. FIG. 6 illustrates an example of grouping a plurality of antennas (#1 to #16). In FIG. 6, it is assumed that the MIMO antenna 130 includes sixteen antennas. In FIG. 6, a particular radiation pattern is illustrated as an oblique line pattern. The same radiation pattern has the same oblique line pattern. The oblique line patterns vary with the direction of oblique lines and the distance between oblique lines. As described above, the radiation pattern varies with the unique pattern and/or polarization characteristic of an antenna element.

Antennas (#1, #3, #9, and #11) having a first radiation pattern is grouped as a first antenna group, antennas (#2, #4, #10, and #12) having a second radiation pattern is grouped as a second antenna group, antennas (#5, #7, #13, and #15) having a third radiation pattern is grouped as a third antenna group, and antennas (#6, #8, #14, and #16) having a fourth radiation pattern is grouped as a fourth antenna group.

FIG. 7 illustrates an example of block diagram for a second communication apparatus 200. The second communication apparatus 200 may include a controller 210 and an antenna 230.

The controller 210 may control an operation of the second communication apparatus 200. The controller 210 may be implemented using a PCB such as a motherboard, an IC, or a SoC.

The controller 210 may include an antenna group selector 213 and a channel information generator 215.

The antenna group selector 213 may receive a reference signal from the first communication apparatus 100 through the antenna 230. The antenna group selector 213 may select an antenna group corresponding to the second communication apparatus 200 among a plurality of antennas included in the MIMO antenna 130 on the basis of the received reference signal. For example, the antenna group selector 213 may select an antenna group that is the most suitable for communicating with the second communication apparatus 200 from among the plurality of antennas 130. The antenna group selector 213 may measure channel information (or channel state information) about each of a plurality of antennas included in the MIMO antenna 130 on the basis of reference signals corresponding to the plurality of antennas.

The channel information generator 215 generates channel information corresponding to the selected antenna group, and transmits the channel information through the antenna 230. The channel information may be fed back to the scheduler 115 of the first communication apparatus 100. For example, the channel information about the antenna group may include channel information about respective antennas included in the selected antenna group.

The channel information generator 215 may generate only channel information about the selected antenna group. The second communication apparatus 200 may feedback only the channel information about the antennas belonging to the selected antenna group. In other words, the second communication apparatus 200 does not feedback channel information about an antenna or an antenna group that is not selected, among the plurality of MIMO antennas 130 of the first communication apparatus 100. Accordingly, the second communication apparatus 200 may reduce feedback overhead for reporting channel information to the first communication apparatus 100.

FIG. 8 illustrates an example of flowchart for a process (300) of allocating resources in a communication system. In FIG. 8, it is assumed that there are two second communication apparatuses 200A and 200B.

The first communication apparatus 100 generates a reference signal regarding an antenna (301). The reference signal is related to a pattern characteristic and/or a polarization pattern of an antenna. The reference signal regarding the pattern characteristic and/or the polarization pattern may be represented in various schemes. The first communication apparatus 100 transmits the reference signal to the second communication apparatus 200A (311). Also, the first communication apparatus 100 transmits a reference signal to the second communication apparatus 200B (312). The first communication apparatus 100 may broadcast reference signals.

The second communication apparatus 200A selects a suitable antenna group on the basis of the received reference signal (321). The second communication apparatus 200A selects a particular antenna group suitable for communicating with the second communication apparatus 200A, and generates channel information about the selected antenna group (321). Then, the second communication apparatus 200A transmits the generated channel information to the first communication apparatus 100 (331).

Then, the first communication apparatus 100 performs communication with the second communication apparatus 200A through the corresponding antenna group using the received channel information (341).

Meanwhile, the second communication apparatus 200B selects a suitable antenna group on the basis of the received reference signal (351). The second communication apparatus 200B selects a particular antenna group suitable for communicating with the second communication apparatus 200B, and generates channel information about the selected antenna group (351). Then, the second communication apparatus 200B transmits the generated channel information to the first communication apparatus 100 (361).

Then, the first communication apparatus 100 performs communication with the second communication apparatus 200B through the corresponding antenna group using the received channel information (371).

FIG. 9 illustrates an example of a process in which a receiving apparatus selects an antenna group of a transmitting apparatus. Similar to the description in FIG. 6, it is assumed that the MIMO antenna 130 of the first communication apparatus 100 includes sixteen antennas (#1 to #16). The antennas are grouped as a first antenna group (#1, #3, #9, and #11), a second antenna group (#2, #4, #10, and #12), a third antenna group (#5, #7, #13, and #15), and a fourth antenna group (#6, #8, #14, and #16). Also, it is assumed that the antenna 230 of the second communication apparatus 200 includes four receiving antennas.

The second communication apparatus 200 may measure channel information (channel state information) about each of the plurality of antennas (#1 to #16) on the basis of reference signals corresponding to the plurality of antennas (#1 to #16) included in the MIMO antenna 130.

The second communication apparatus 200 may obtain a channel matrix corresponding to each of the plurality of antenna groups (Group 1 to Group 4) on the basis of the channel information.

The second communication apparatus 200 may select an antenna group corresponding to the second communication apparatus 200 among the plurality of antenna groups (Group 1 to Group 4) on the basis of the channel matrices.

The channel matrices corresponding to the first antenna group (Group 1), the second antenna group (Group 2), the third antenna group (Group 3), and the fourth antenna group (Group 4) are referred to as $H_1$, $H_2$, $H_3$, and $H_4$. The channel matrix corresponding to the antenna group includes channel information about respective antennas included in the antenna group. The channel matrix represents information about a channel between a transmission antenna and a receiving antenna. Channel information about an antenna included in the MIMO antenna 130 is defined as $h_{m,n}$. Here, m is an index of an antenna included in the second communication apparatus 200, and n is an index of an antenna included in the first communication apparatus 100. For example, $h_{2,3}$ may represent channel information between a third antenna of the first communication apparatus 100 and a second antenna of the second communication apparatus 200.

The second communication apparatus 200 may select an antenna group corresponding to the second communication apparatus 200 among the plurality of antenna groups Group 1 to Group 4 by comparing channel gains of the channel matrices $H_1$, $H_2$, $H_3$, and $H_4$ corresponding to the respective antenna groups Group 1 to Group 4 from each other.

The second communication apparatus 200 may calculate channel gains of the channels $H_1$, $H_2$, $H_3$, and $H_4$ corresponding to the antenna groups Group 1 to Group 4. For example, a channel gain of each channel matrix ($H_1$, $H_2$, $H_3$, and $H_4$) corresponding to each of the antenna groups Group 1 to Group 4 may be a sum of squares of each component included in the corresponding channel matrix.

The second communication apparatus 200 may select an antenna group which has the largest channel gain among the plurality of antenna groups Group 1 to Group 4 on the basis of the calculated channel gains. The channel gain may be an average channel gain between the first communication apparatus 100 and the second communication apparatus 200.

As another example, the second communication apparatus 200 may select an antenna group corresponding to the second communication apparatus 200 among the plurality of antenna groups Group 1 to Group 4 by comparing rank values of the channel matrices $H_1$, $H_2$, $H_3$, and $H_4$ corresponding to the respective antenna groups Group 1 to Group 4 from each other.

The second communication apparatus 200 may calculate rank values rank($H_1$) rank($H_2$) rank($H_3$), and rank($H_4$) of the channel matrices $H_1$, $H_2$, $H_3$, and $H_4$ corresponding to the antenna groups Group 1 to Group 4.

In a channel, for example, an MIMO channel, a rank represents the number of paths that are effectively separated between the second communication apparatus 200 and the first communication apparatus 100.

For example, even when the second communication apparatus 200 includes four antennas, the second communication apparatus 200 may not, for rank=1, separate multiplexed signals transmitted from the first communication apparatus 100. The second communication apparatus 200 receives signals through a single path and thus the multiplexed signals are mixed.

In other words, the rank serves as an important factor for determining a gain in the channel.

The second communication apparatus 200 may select an antenna group which has the largest rank value among the plurality of antenna groups Group 1 to Group 4 on the basis of the calculated rank values.

As another example, the second communication apparatus 200 may select an antenna group corresponding to the second communication apparatus 200 among the plurality of antenna groups Group 1 to Group 4 by comparing condition numbers of the channel matrices $H_1$, $H_2$, $H_3$, and $H_4$ corresponding to the respective antenna groups Group 1 to Group 4 from each other.

The second communication apparatus 200 may calculate condition numbers $cond(H_1)$, $cond(H_2)$, $cond(H_3)$, and $cond(H_4)$ of the channels $H_1$, $H_2$, $H_3$, and $H_4$ corresponding to the antenna groups Group 1 to Group 4.

The condition number represents a ratio of a maximum singular value to a minimum singular value of a matrix. For example, in an MIMO channel, a singular value of a channel matrix may represent power of a path that is effectively separated between the second communication apparatus 200 and the first communication apparatus 100.

For example, as the condition number approaches 1, the MIMO channel approximates an ideal MIMO channel. A large condition number represents a large difference between a maximum singular value and a minimum singular value, representing a large difference in power between paths that are effectively separated. Since a great power needs to be allocated to a path having a small singular value to ensure a predetermined communication capacity, a large condition number may not be desirable.

The second communication apparatus 200 may select an antenna group which has a condition number which is the closest to 1, among the plurality of antenna groups Group 1 to Group 4 on the basis of the calculated condition numbers.

The second communication apparatus 200 may select an antenna group corresponding to the second communication apparatus 200 among the plurality of antenna groups Group 1 to Group 4 by comparing at least one of channel gains, rank values, and condition numbers of the channel matrices $H_1$, $H_2$, $H_3$, and $H_4$ corresponding to the respective antenna groups Group 1 to Group 4 among each other.

Also, the second communication apparatus 200 may select an antenna group corresponding to the second communication apparatus 200 among the plurality of antenna groups Group 1 to Group 4 by comparing at least one of channel gains, rank values, and condition numbers of the channel matrices $H_1$, $H_2$, $H_3$, and $H_4$ corresponding to the respective antenna groups Group 1 to Group 4 among each other according to an order of priorities. The order of priorities may be preset. In this case, the second communication apparatus 200 may assign a weight to at least two of a channel gain, a rank value, and a condition numbers of a criterion for selecting an antenna group (a channel matrix: $H_1$, $H_2$, $H_3$, and $H_4$) according to the order of priorities, and select an antenna group on the basis of a weighted sum.

The second communication apparatus 200 may feedback channel information corresponding to the selected antenna group to the scheduler 115 of the first communication apparatus 100.

Referring to FIG. 9, the second communication apparatus 200 may select the second antenna group Group 2 as an antenna group corresponding to the second communication apparatus 200 and may feedback channel information corresponding to the second antenna group Group 2. The second communication apparatus 200 may not feedback channel information corresponding to the antenna groups Group 1, Group 3, and Group 4 that are not selected. As such, the second communication apparatus 200 feedbacks only channel information about the four antennas included in the second antenna group Group 2, so that 75% of feedback overhead is saved.

In addition, although not shown in FIG. 9, the second communication apparatus 200 may transmit channel information about an antenna group having the second most optimal channel gain as well as channel information about an antenna group having the most optimal channel gain. In this case, transmission of additional channel information may increase overhead, but the first communication apparatus 100 may appropriately allocate loads between the antenna groups.

FIG. 10 illustrates an example of resources allocated by a transmitting apparatus. For example, the first communication apparatus 100 may allocate resources to the second antenna group Group 2 in response to channel information corresponding to the second antenna group Group 2 that has been feedback. The first communication apparatus 100 may communicate with the second communication apparatus 200 through the allocated resources. The resources may be time-frequency resources.

Further, the first communication apparatus 100 may form different beams using a plurality of antennas. In this case, the beams may serve as resources. Also, the first communication apparatus 100 may use antennas each having a different pattern characteristic and/or polarization characteristic, and in this case, the pattern characteristics and/or polarization characteristics may serve as new resources.

With respect to the same time-frequency resource, the first communication apparatus 100 may use different beams/pattern characteristics/polarization characteristics as different dimensional resources. Referring to FIG. 10, the first communication apparatus 100 may allocate a resource which is different in at least one of a beam, a pattern characteristic, and a polarization characteristic, to the same time-frequency resource.

That is, the communication system 1000 may provide a communication service having no or less channel interference while using the same time-frequency resource by using antennas having different pattern characteristics and/or polarization characteristics. A plurality of antenna groups of the first communication apparatus 100 may communicate with different second communication apparatuses 200 using the same time-frequency resources. Accordingly, the communication system 1000 may increase the channel capacity while using limited time-frequency resources.

When remaining one or more antenna groups (Group 1, Group 3, and Group 4) have a large difference in channel gain among each other, the first communication apparatus 100 may allocate the same time-frequency resource, which is allocated to the second antenna group Group 2, to the remaining one or more antenna groups (at least one of Group 1, Group 3, and Group 4). In this case, the first communication apparatus 100 may communicate with the second communication apparatus 200 using a polarization characteristic and/or pattern characteristic which is different from that of the remaining one or more antenna groups (at least one of Group 1, Group 3, and Group 4).

Meanwhile, the second communication apparatus 200 may transmit channel information about another antenna group in addition to the antenna group having the highest channel gain. In this case, the first communication apparatus 100 may allocate resources to the other antenna group in consideration of load distributions of the plurality of antenna groups Group 1 to Group 4 in the same way as the above.

The above-described apparatus may be implemented as a hardware component, a software component, and/or a combination of a hardware component and a software component. For example, the devices and components of the above-described embodiments may be implemented using one or more general-purpose or special-purpose computers, such as a processor, a controller, an arithmetic logic unit (ALU), a digital signal processor, a microcomputer, a field programmable gate array (FPGA), a programmable logic unit (PLU), a microprocessor, or any other devices capable of executing and responding to an instruction. A processing device may execute an operating system (OS) and one or more software applications running on the OS. In addition, the processing device may access, store, manipulate, process, and generate data in response to execution of the software. For convenience of understanding, the processing device may be described as a single unit, but those skilled in the art will recognize that the processor may include a plurality of processing elements and/or a plurality of types of processing elements. For example, the processing device may include a plurality of processors, or one processor and one controller. Other processing configurations are also possible, such as a parallel processor.

The software may include a computer program, code, instructions, or a combination of one or more of the foregoing, and may configure or independently or collectively instruct the processing device to operate as desired. Software and/or data may be embodied permanently or temporarily on any type of machine, component, physical device, virtual equipment, computer storage media or device, or in a propagated signal wave so as to be interpreted by the processing device or to provide the processing device with instructions or data. The software may be distributed over a networked computer system and stored or executed in a distributed manner. The software and data may be stored on one or more computer readable recording media.

The present embodiment and the accompanying drawings in this specification are only a part of the technical scope included in the above-described technique, and all variations and specific embodiments which can be easily inferred by those skilled in the art within the technical scope included in the specification and drawings of the above-described technique may be understood as being included in the scope of the above-described technique.

What is claimed is:

1. A method of transmitting channel information in a pattern/polarization beam division multiple access (BDMA) based receiving apparatus, the method comprising:
    selecting, by a receiving apparatus, a particular antenna group among a plurality of antenna groups that are grouped from a plurality of antennas included in a transmitting apparatus on the basis of a reference signal received from the transmitting apparatus; and
    transmitting, by the receiving apparatus, channel information corresponding to the particular antenna group to the transmitting apparatus,
    wherein the plurality of antenna groups have at least one of a pattern characteristic and a polarization characteristic which is different among the plurality of antenna groups, and the receiving apparatus selects the particular antenna group which has a highest channel gain among the plurality of antenna groups by using a reference signal related to at least one of patterns and polarizations of the plurality of antennas.

2. The method of claim 1, wherein one of the plurality of antenna groups includes antennas having at least one of a pattern characteristic and a polarization characteristic which is identical between the antennas in the one group.

3. The method of claim 1, wherein the receiving apparatus selects an additional antenna group which has a second highest channel gain ranked behind the particular antenna group among the plurality of antenna groups, and additionally transmits channel information about the additional antenna group.

4. The method of claim 1, wherein
    the receiving apparatus obtains channel matrices about the plurality of antenna groups using the reference signal related to at least one of patterns and polarizations of the plurality of antennas, and selects the particular antenna group on the basis of the channel matrices.

5. The method of claim 4, wherein the receiving apparatus selects the particular antenna group by comparing at least one of channel gains, rank values and condition numbers of the channel matrices.

6. The method of claim 4, wherein the receiving apparatus selects an antenna group having a highest rank value of the channel matrix among the plurality of antenna groups as an antenna group corresponding to the receiving apparatus.

7. The method of claim 4, wherein the receiving apparatus selects an antenna group having a condition number of the channel matrix which is closest to 1 among the plurality of antenna groups as an antenna group corresponding to the receiving apparatus.

8. A method of allocating resources in a transmitting apparatus based on pattern/polarization beam division multiple access (BDMA), the method comprising:
    transmitting, by a transmitting apparatus, a reference signal with respect to a plurality of antennas that are grouped into a plurality of antenna groups;
    receiving, by the transmitting apparatus, channel information about a particular antenna group that is selected by a receiving apparatus from the plurality of antenna groups using the reference signal; and
    allocating, by the transmitting apparatus, a resource to the particular antenna group using the channel information,
    wherein the plurality of antenna groups have at least one of a pattern characteristic and a polarization characteristic which is different among the plurality of antenna groups, and
    the channel information is about the particular antenna group which is selected as an antenna group having a highest channel gain among the plurality of antenna groups on the basis of the reference signal which is related to at least one of patterns and polarizations of the plurality of antennas.

9. The method of claim 8, wherein one of the plurality of antenna groups includes antennas having at least one of a pattern characteristic and a polarization characteristic which is identical between the antennas in the one group.

10. The method of claim 8, wherein
    the transmitting apparatus allocates a same frequency-time resource to the particular antenna group and at least one antenna group except for the particular antenna group among the plurality of antenna groups.

11. A receiving apparatus based on pattern/polarization beam division multiple access (BDMA), the receiving apparatus comprising:
    an antenna configured to receive a reference signal related to at least one of patterns and polarizations of a plurality of antennas included in a transmitting apparatus, and configured to transmit channel information; and
    a controller configured to select a particular antenna group among a plurality of antenna groups that are grouped from the plurality of antennas included in the transmitting apparatus using the reference signal, and configured to generate the channel information corresponding to the particular antenna group,
    wherein the plurality of antenna groups have at least one of a pattern characteristic and a polarization characteristic which is different among the plurality of antenna groups, and the controller selects the particular antenna group having a highest channel gain using the reference signal among the plurality of antenna groups.

12. The receiving apparatus of claim 11, wherein the controller obtains channel matrices about the plurality of antenna groups using the reference signal and selects the particular antenna group on the basis of the channel matrices.

13. The receiving apparatus of claim 12, wherein the controller selects the particular antenna group by comparing at least one of channel gains, rank values, and condition numbers of the channel matrices.

* * * * *